United States Patent [19]

Cohen

[11] 4,312,099

[45] Jan. 26, 1982

[54] PROCESS FOR SHUCKING A MOLLUSK

[75] Inventor: Max Cohen, Cape May Court House, N.J.

[73] Assignee: Borden, Inc., Columbus, Ohio

[21] Appl. No.: 122,344

[22] Filed: Feb. 19, 1980

Related U.S. Application Data

[63] Continuation-in-part of Ser. No. 916,314, Jun. 16, 1978, Pat. No. 4,198,728.

[51] Int. Cl.³ .............................................. A22C 29/04
[52] U.S. Cl. ............................................ 17/48; 17/74
[58] Field of Search .......................... 17/48, 74, 46, 51

[56] References Cited

U.S. PATENT DOCUMENTS

| | | | |
|---|---|---|---|
| 2,473,609 | 6/1949 | Plock | 17/74 |
| 2,832,989 | 5/1958 | Harris | 17/48 |
| 3,665,554 | 5/1972 | Wenstrom et al. | 17/45 |
| 3,683,458 | 8/1972 | Wenstrom et al. | 17/48 |
| 4,143,444 | 3/1979 | Cox | 17/48 X |

Primary Examiner—Willie G. Abercrombie
Attorney, Agent, or Firm—Seidel, Gonda, Goldhammer & Panitch

[57] ABSTRACT

Raw mollusks at room temperature are fed to a crusher wherein a mechanical shock is introduced to the mollusks with the magnitude of the shock being sufficient to release attachment between the mollusk meat and the mollusk shell by rapidly accelerating and then rapidly decelerating the mollusks using a rotating roller having a minimum surface speed of about 2800 feet per minute. The mollusks are then separated into a first stream of loose meat and meat attached to shells and a second stream of loose meat and shells. Each stream is then subjected to centrifugal separation whereupon the first stream shells having meat attached thereto is recycled through a crusher.

4 Claims, 6 Drawing Figures

4,312,099

PROCESS FOR SHUCKING A MOLLUSK

COMPANION CASE

This application is a CIP of my pending application Ser. No. 916,314 filed June 16, 1978 and entitled Process For Shucking A Mollusk now U.S. Pat. No. 4,198,728.

BACKGROUND

Mollusks is a generic name of a number of so-called seafoods including clams, oysters, scallops, etc. The process of opening and removal of the meat from the shell is known in the trade as shucking. Shucking has been accomplished heretofore manually and by apparatus. Shucking by apparatus is preferable for the economies involved since shucking by hand is slow, tedious and expensive.

It is known to mechanically shuck mollusks by first heat treating the mollusks or freezing them and then subjecting the mollusks to shock by a rotating roller and breaker bar. As set forth in U.S. Pat. Nos. 2,832,989 and 3,665,554, mollusks are subjected to a mechanical shock which is sufficient to weaken the muscles and/or slightly open the shell without damaging the shell. Thereafter, the mollusks in said patents are subjected to a heat treatment and then are subjected to a second shock which opens and/or separates the meat from the shell. The requirement for pretreating the mollusks by heat or refrigeration unnecessarily complicates the process, adds to the cost of the process, and/or makes it impractical to use the process at sea where it is desired to immediately shuck mollusks abroad ship.

Thus, prior processes heretofore which utilize mechanical shock do so in connection with other processing steps involving heat or refrigeration as a means for weakening the muscle and the attachment of the meat to the shell.

The texture of meat shucked without heat is quite different from that shucked with heat. Meat shucked without the application of heat is more tender. Excessive toughness is a problem in some forms of mollusk meat products. Thus, tenderization achieved by this process in these products is a significant advantage.

I have found that the yield when practicing the method of my above mentioned application can be increased by recycling one of the streams after centrifugal separation of both streams.

SUMMARY OF THE INVENTION

The present invention is directed to a process for shucking mollusks and includes feeding raw mollusks at room temperature with or without any prior heat treatment to a crusher. A mechanical shock is introduced to the mollusks in the crusher with the magnitude of the shock action being sufficient to release the attachment between the mollusk meat and the mollusk shell without breaking up the meat to any substantial extent. The meat and shells are separated into first and second streams wherein the first stream has loose meat and meat attached to a shell. The second stream is shells and some inadvertant loose meat. Each stream is subjected to a centrifugal separator or equivalent so as to separate the loose meat in each stream. The meat attached to shells from the first stream is then subjected to a repeat of the crushing step.

The measure of efficiency of any shucking process is the yield measured in pounds of meat per bushel or mollusk. The present process has yields which are compatible with efficient processes used commercially heretofore and better than some of the lesser efficient processes used heretofore while at the same time materially reducing both capital investment and operating costs. Energy consumed by the present process is a small fraction of that consumed by most commercial processes used heretofore. Production capacity is increased not only at greater reduced investment but also because the present invention uses a fraction of the physical space required by the process used heretofore. As a result thereof, the present invention lends itself to processing mollusks aboard ship whereby there will be less loss due to softness, deterioration due to time and temperature and breakage because of the firmer, tougher texture of the live, cold, freshly caught mollusks. Since shucked mollusks take less room than unshucked mollusks, a ship can bring in a larger payload.

It is an object of the present invention to provide a method for processing mollusks in a manner which is simple, inexpensive, and efficient.

It is another object of the present invention to provide a process for shucking a mollusk which can be performed onboard ship using live, freshly caught mollusks whereby the shells may be thrown overboard thereby eliminating a disposal problem, the meat is firmer, and the ship can bring in a larger payload.

Other objects will appear hereinafter.

For the purpose of illustrating the invention, there is shown in the drawings a form which is presently preferred; it being understood, however, that this invention is not limited to the precise arrangements and instrumentalities shown.

Referring to the drawings in detail, wherein like numerals indicated like elements, there is shown the preferred apparatus when practicing the present invention.

Figure 1:
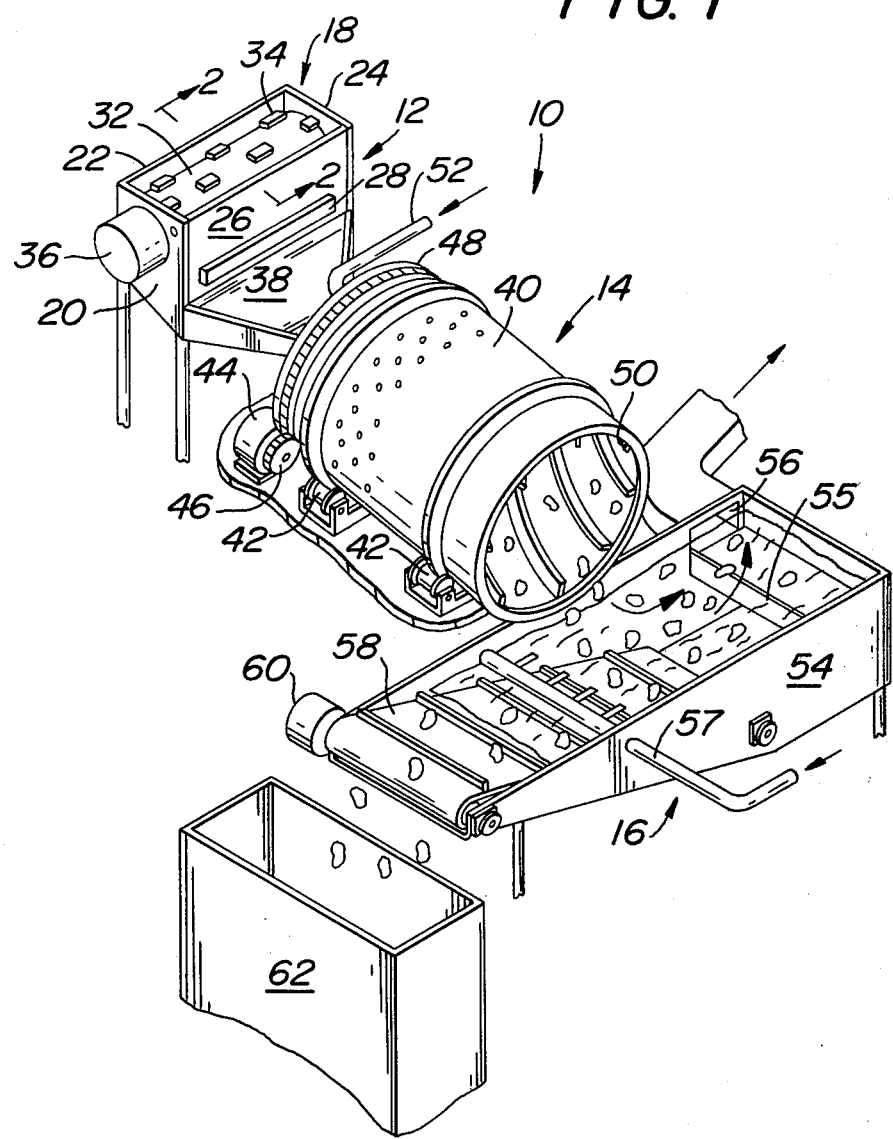
FIG. 1 is a perspective view of apparatus which can be utilized in practicing the present invention.
Figure 2:
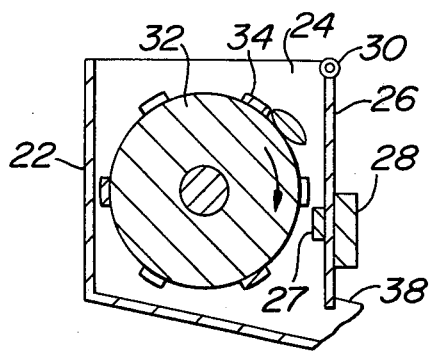
FIGS. 2–4 are sequential illustrations of a mollusk such as a clam being processed with the views being taken along line 2—2 in FIG. 1.
Figure 3:
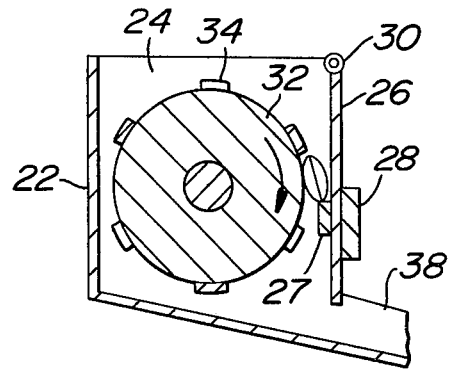

The apparatus designated generally as 10 includes three major components namely the crusher 12, the washer 14, and the separator 16. The crusher 12 includes a housing designated generally as 18. The housing 18 includes wall 22 which interconnects the parallel walls 20 and 24. Opposite wall 22, there is provided a plate 26 hinged for pivotable movement at its upper edge by hinge pins 30 connected to the side walls 20, 24. Plate 26 is provided with a weight 28 attached thereto or is spring biased to the position shown in FIG. 2.

A roller 32 is rotatably supported by bearings on the walls 20, 24. Roller 32 may have a substantial diameter such as 14 to 18 inches. On an 18 inch diameter roller 32, there is provided a plurality of staggered rows of projections 34 which project outwardly for a distance of about 2 inches. The roller 32 and its projections are made of steel or some other hard metal. Roller 32 may be solid or hollow. Roller 32 is driven by motor 36 which is preferably a variable speed motor having a sufficiently high operating range whereby it may rotate the roller 32 at speeds up to about 1000 rpm.

The bottom wall of the housing 18 slopes downwardly into a downwardly angled chute 38. Chute 38 tapers inwardly and discharges into a drum 40 that is open at each end. Drum 40 is provided with tires on its outer periphery each rotatably supported by a roller 42 so as to rotate about an axis which is slightly inclined so that the discharge end thereof is slightly below the inlet end at the chute 38.

A motor 44 has a gear 46 connected to its output shaft. Gear 46 is connected to a gear 48 surrounding the drum 40. The drum 40 is rotated about is longitudinal axis by motor 44. The inner periphery of drum 40 is provided with a plurality of helically arranged ribs 50. A conduit 52 has its discharge end adjacent the inlet end of drum 40 for introduction of water into the drum 40.

The discharge end of drum 40 is disposed above a trough 54. Trough 54 is shallow and has a weir 55 adjacent one end containing the outlet 56. An endless conveyor having cleats thereon and designated 58 is supported by the shallow trough 50. Conveyor 58 is driven by motor 60. Motor 60 is supported by a bracket on the trough 54. If desired, a container 62 may be provided adjacent the discharge location of conveyor 58.

Figure 4:
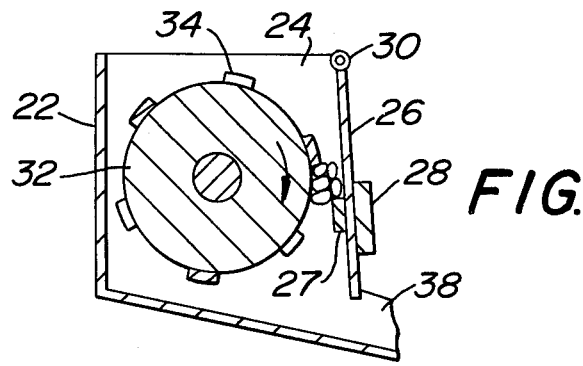

The housing 12 is preferably provided with a hopper having a wall overlying that portion of the upper end of walls 20, 24 adjacent the plate 26. Mollusks such as clams are fed by conveyor or by gravity through a hopper to the upper end of the crusher 12. The roller 32 is preferably rotating with a minimum surface speed of about 2800 feet per second. On an 18 inch diameter roller 32, motor 36 rotates the roller with a preferred minimum speed of 600 rpm. The projections 34 contact the clams and rapidly accelerate the same by pushing along a side edge of the clam. The clam is then rapidly decelerating by contact with the breaker bar 27 during which the shell is broken. The forces imparted to the breaker bar 27 cause the plate 26 to pivot from the position shown in FIG. 2 to the position shown in FIG. 4 whereby the meat and broken shell fall into the chute 38.

By gravity, the meat and broken shell are introduced into the drum 40 having perforations of about ⅛ inch. While passing through the drum 40, the meat is washed and any sand associated therewith is separated from the meat by draining with the washwater through the holes in the side of the drum to a collection trough not shown. Drum 40 may discharge the meat and shells to separator trough 54 filled with brine having a hight salt concentration. The shells have a higher specific gravity and therefore fall to the bottom of the trough 54 and are removed therefrom by the conveyor 58. Conveyor 58 may discharge the shells overboard when the apparatus 10 is on a ship. If more convenient, conveyor 58 may discharge the shells into a container 62. The meat has a much lower specific gravity and therefore will float with the brine over the weir 55 and through the outlet 56 to mesh separating screen. The separating screen has perforations sufficiently small so as to retain the meat while permitting the brine to discharge into a suitable receptacle and from which the brine may be pumped to manifold 57 in trough 54 for reuse.

While passing through the crusher 12, the clam was subjected to a mechanical shock action of suficient magnitude so as to release the attachment between the meat and the shell without breaking up the meat to any substantial extent. Thus, it would be undesirable to pulverize the meat. The consuming public prefers to have large chunks of clam meat as opposed to very fine pieces of clam meat. The shock action is a combination of shearing and crushing forces applied by the projections 34 and the breaker bar 27 with simultaneous rapid deceleration of the clam. Rapid acceleration just prior to the crushing and shearing adds to the effect.

Figure 5:
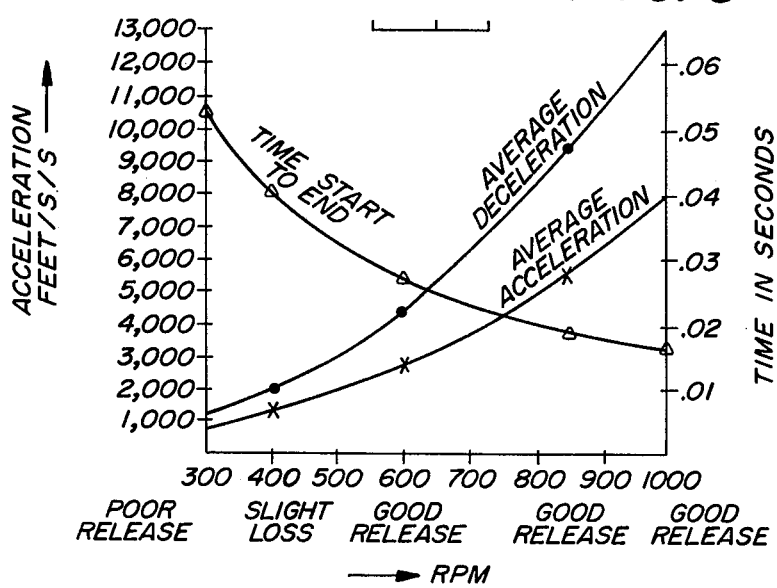
FIG. 5 is a graph of acceleration in time versus rpm.

In FIG. 5, there is illustrated a graph of acceleration and time versus speed. On the basis of testing the present invention, I have found that when the surface speed is substantially below about 2800 feet per minute (an 18 inch diameter roller driven at 600 rpm), there are fair to poor results on efficiency in that the meat tends to remain attached to the shell portions whereby the yield is low or unacceptable. Beginning at about a surface speed of 2800 feet per minute, and at speeds thereabove, there is a good release between the meat and the shell so as to result in a satisfactory yield. The speed may be as low as 400 rpm (surface speed of about 1900 fpm) if one is willing to accept only a fair yield. Since it is inefficient to rotate the roller at speeds in excess of that needed for a good yield, the roller 32 need not be rotated above speeds of about 1000 rpm. As will be apparent from FIG. 5, the present invention subjects the clams to acceleration forces of between about 3000 and 8000 feet per second.

The present process eliminates the need for preheating the mollusks. I have found that no heat is much more efficient in yield than large amounts of heat which are inadequate to relese the meat from the shell. I have found that the most efficient yields with the present invention are attained when the projection 34 pushes the shell with a line of force along a side edge of the mollusks parallel to the shell-muscle attachment surface. The weight 28 may be variable so as to accommodate to different sized mollusks with heavier weights being utilized with the larger sized mollusks. The weight 28 should bias the plate 26 to a generally vertical disposition whereby the projections 34 will just clear the breaker bar 27 in the absence of a mollusk and will cause the plate 26 to be pushed away from the surface of the roller 32 when the shell is being broken to facilitate discharge of the shell and meat into the chute 38. Suitable limit stops are provided to prevent the plate 26 from swinging sufficintly close to the roller 32 whereby the projections 34 contact the breaker bar 27. If the mollusk is fairly clean, washer drum 40 may be eliminated whereby chute 38 would discharge directly into trough 54.

Figure 6:
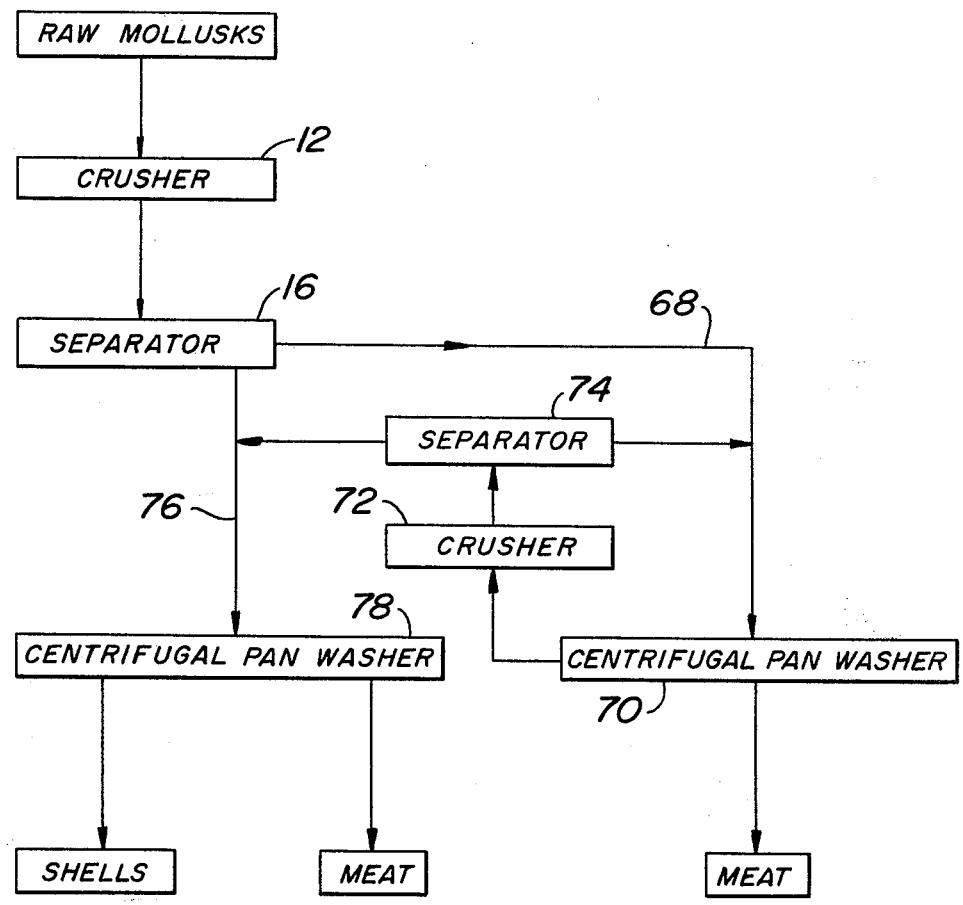
FIG. 6 is a recycling diagram.

The preferred handling of the mollusks after initial separation is illustrated in FIG. 6. Outlet 56 is the inlet to conduit 68 which is connected to a centrifugal pan washer 70 or equivalent and constitutes a first stream of loose meat and meat attached to a piece of shell screened at outlet 56 to a size less than one inch. At the washer 70, the loose meat is separated from the meat attached to a piece of shell. The latter is directed to an auxillary crusher 72 where the above process is repeated. Crusher 72 is the same as but smaller than crusher 12. Thereafter the crusher 72 directs the stream to separator 74. Meat is directed from separator 74 to conduit 68 while the shells are directed to conduit 76.

Conduit 76 corresponds to container 62 and receives the shells and some loose meat from separate 16. Conduit 76 defines the second stream and communicates with a centrifugal pan washer 78 or equivalent. At washer 78 the second stream is divided into shells and loose meat.

Meat attained by the process of my above mentioned application is much softer in texture as compared with conventional processes. If it is desired to use meat attained by my process with meat attained by a conventional shucking process, it was necessary to slightly modify the process. Meat which had identical texture/firmness in soup to that of conventionally processed clams was attained as follows. The clams were blanched for 1 minute at 170° F. and then shucked as described above with the speed of roller 32 being at 400–500 rpm. Thereafter the meat was blanched at 210° F. for 10–20 seconds to deactivate enzymes for stability of storage. The first blanching step does not assist in release of the meat.

If 30,000 lbs of raw clams are processed, the first stream will be about 3000 lbs of meat and 6000 lbs of shells with about 450 lbs of meat attached. The second stream will be about 12,000 lbs of shells and about 400 lbs of loose meat. Another 6000 lbs of shells are added to the second stream from crusher 72. About 3400 lbs of meat is obtained from washer 70 and about 400 lbs of meat washer 78. The remainder of the weight is sand, water, etc. Thus, recycling in this manner increases the yield from about 3000 lbs up to about 3800 lbs.

The present invention may be embodied in other specific forms without departing from the spirit or essential attributes thereof and, accordingly, reference should be made to the appended claims, rather than to the foregoing specification, as indicating the scope of the invention.

I claim:

1. A process for shucking mollusks comprising:
   (a) feeding raw mollusks to a crusher,
   (b) introducing a mechanical shock action to the mollusks in said crusher with the magnitude of the shock action being sufficient to release the attachment between the mollusk meat and the mollusk shell,
   (c) performing step (b) in a manner so that the mollusks are rapidly accelerated and then rapidly decelerated and are subjected to a combination of shearing and crushing forces applied by two cooperating elements which break the shell while the mollusks are decelerated,
   (d) dividing the shucked mollusks into a first stream of loose meat and meat attached to a piece of shell and a second stream of shells and inadvertant loose meat,
   (e) separating out the loose meat of the first stream,
   (f) recycling the remainder of the first stream as per steps (b) and (c), separating any meat from the shells after the second shock action and adding the separated meat to the meat attained in step (e),
   (g) separating the loose meat of the second stream from the shells and adding such loose meat to the meat of step (e).

2. A process in accordance with claim 1 including using a centrifugal pan washer during the separating steps (e) and (g).

3. A process in accordance with claim 1 including using a roller as one of said cooperating elements with a speed of 400–500 rpm, and blanching said mollusks at a temperature and for a length of time which is insufficient to cause release of meat from its shell to thereby increase the firmness of the meat texture for blending with other meat having firm texture.

4. A process in accordance with claim 1 wherein said steps are performed on board a sea going vessel with freshly caught mollusks without any heat treatment of the mollusks sufficient to release meat from the shells.

* * * * *